(12) United States Patent
McCormick et al.

(10) Patent No.: US 12,170,567 B2
(45) Date of Patent: Dec. 17, 2024

(54) SYSTEMS AND METHODS FOR GENERATING ELECTRON DENSITY MAPS

(71) Applicant: Georgia Tech Research Corporation, Atlanta, GA (US)

(72) Inventors: Jackson McCormick, Atlanta, GA (US); Morris Cohen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 326 days.

(21) Appl. No.: 17/786,603

(22) PCT Filed: Dec. 21, 2020

(86) PCT No.: PCT/US2020/066359
§ 371 (c)(1),
(2) Date: Jun. 17, 2022

(87) PCT Pub. No.: WO2021/127626
PCT Pub. Date: Jun. 24, 2021

(65) Prior Publication Data
US 2023/0124039 A1    Apr. 20, 2023

Related U.S. Application Data

(60) Provisional application No. 62/950,630, filed on Dec. 19, 2019.

(51) Int. Cl.
*H04B 7/22*   (2006.01)
*G01V 9/00*   (2006.01)

(52) U.S. Cl.
CPC .............. *H04B 7/22* (2013.01); *G01V 9/007* (2013.01)

(58) Field of Classification Search
CPC .................................. H04B 7/22; G01V 9/007
See application file for complete search history.

(56) References Cited

U.S. PATENT DOCUMENTS

| 2006/0080038 A1 | 4/2006 | Jakowski et al. |
| 2014/0163938 A1 | 6/2014 | Sparks et al. |

(Continued)

FOREIGN PATENT DOCUMENTS

DE    102008029441 A1    12/2009

OTHER PUBLICATIONS

International Search Report and Written Opinion from Application No. PCT/US2020/066359 dated Mar. 23, 2021.

*Primary Examiner* — Vladimir Magloire
*Assistant Examiner* — Maxine McKenzie Phillips
(74) *Attorney, Agent, or Firm* — Troutman Pepper Hamilton Sanders LLP; Ryan A. Schneider; Matthew J. Esserman

(57) ABSTRACT

An embodiment of the disclosure provides a method of generating an electron density map of a D-region of the ionosphere. The method can comprise: defining a plurality of grid pixels corresponding to a portion of the D-region of the ionosphere; receiving a plurality of electromagnetic signals, each of the plurality of electromagnetic signals having propagated along a distinct propagation path through a portion of the D-region corresponding to one or more of the plurality of grid pixels; clustering the plurality of electromagnetic signals based on similarities in a point-of-origin of the plurality of electromagnetic signals; determining a path-averaged electron density curve for each of the plurality of clustered signals; determining a basis representation of an electron density curve of the plurality of grid pixels, which is consistent with the path-averaged electron density curves; and generating, based on the basis representation, an electron density map for the D-region of the ionosphere.

26 Claims, 13 Drawing Sheets

(56) References Cited

U.S. PATENT DOCUMENTS

2016/0173360 A1   6/2016  Goldin et al.
2016/0370478 A1  12/2016  Ouzounov et al.

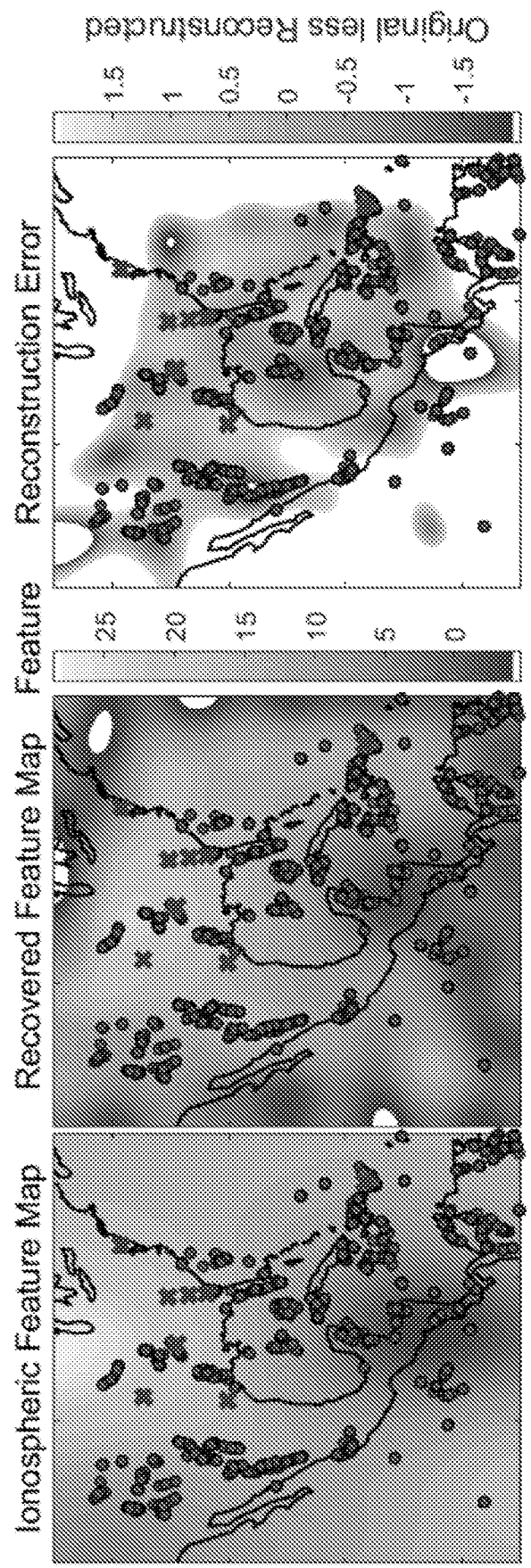

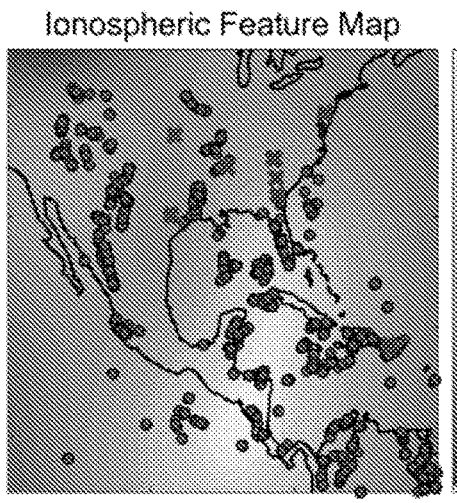
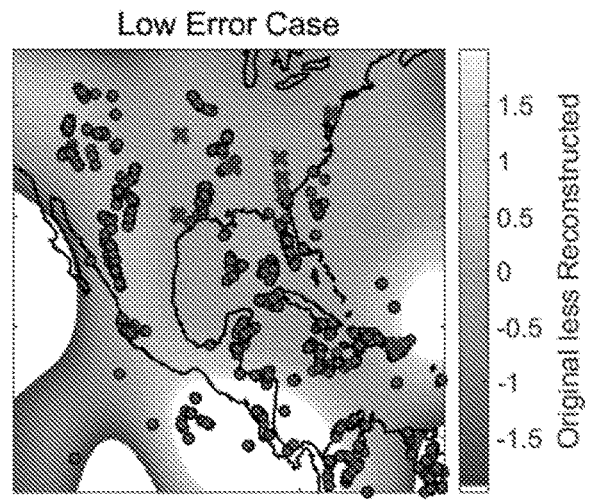
FIG. 6A          FIG. 6B
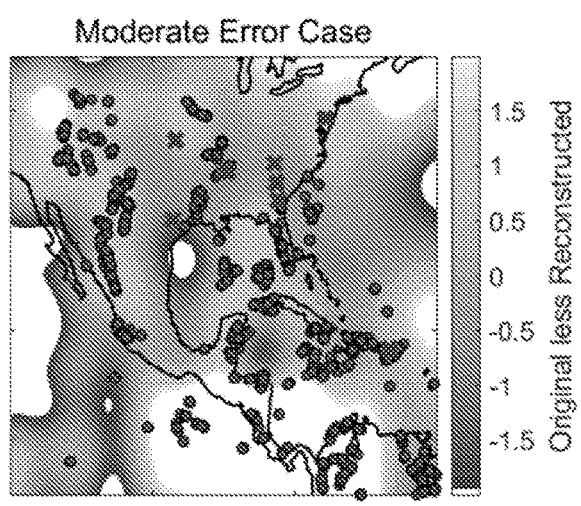
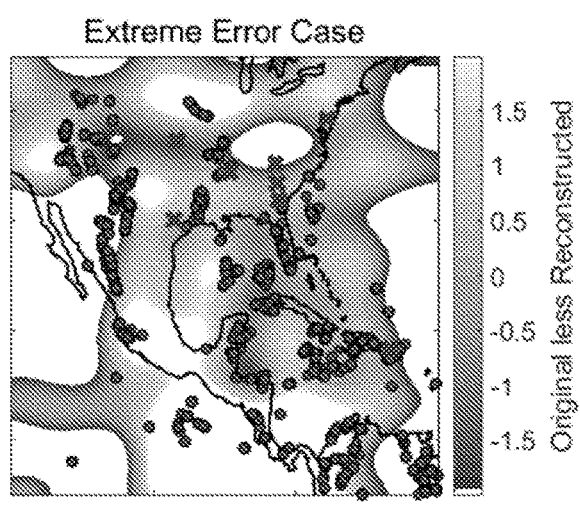
FIG. 6C          FIG. 6D

SYSTEMS AND METHODS FOR GENERATING ELECTRON DENSITY MAPS

CROSS-REFERENCE TO RELATED APPLICATIONS

This application claims the benefit of U.S. Provisional Application Ser. No. 62/950,630, filed on 19 Dec. 2019, which is incorporated herein by reference in its entirety as if fully set forth below.

GOVERNMENT LICENSE RIGHTS

This invention was made with government support under 1451142 and 1653114, awarded by the National Science Foundation. The government has certain rights in the invention.

FIELD OF THE DISCLOSURE

The various embodiments of the present disclosure relate generally to mapping systems and methods, and more particularly to systems and methods for generating an electron density map of the D-region of the ionosphere.

BACKGROUND

The ionosphere is an ionized layer of the atmosphere constituted of plasma primarily driven by radiation from the sun and galactic cosmic rays. Understanding the ionosphere is mission critical for many radio technologies in both the military and commercial space. The lower ionosphere, referred to as the D-region (40 to 100 km altitude from Earth's surface), is relatively poorly understood and sparsely measured partly due to the difficulty of making direct measurements and partly due to the global spatial scales in which many phenomena occur.

Extremely low frequency ("ELF") (0.3-3 kHz), very low frequency ("VLF") (3-30 kHz), and low frequency ("LF") (30-300 kHz) waves reflect between the D region (40 to 100 km altitude) of the ionosphere and the surface of the Earth traveling to global distances in a guided fashion. Using an ELF/VLF/LF propagation code and inverse modeling it is possible to infer a best-fit electron density curve versus altitude that many interpret as the average along a given transmitter-to-receiver path. Conventional methods have used narrow frequency-band VLF transmitters to infer the electron density versus altitude along a handful of paths during different solar conditions. Others have used the VLF signals emitted by natural lightning to infer the electron density versus altitude from lightning-to-receiver paths. These conventional techniques, however, are insufficient to provide a four dimensional (latitude, longitude, altitude, and time) map of the electron density of the D-region of the ionosphere. Embodiments of the present disclosure address this need as well as other needs that will become apparent upon reading the description below in conjunction with the drawings.

BRIEF SUMMARY

The present disclosure relates to systems and method for generating an electron density map of a D-region of an ionosphere. An exemplary embodiment of the present disclosure provides a method of generating an electron density map of an ionosphere, the ionosphere comprising a D-region. The method can comprise: defining a plurality of grid pixels corresponding to at least a portion of the D-region of the ionosphere, each of the grid pixels having a substantially equal size in longitude and latitude; receiving a plurality of electromagnetic signals at a plurality of receivers, each of the plurality of electromagnetic signals having propagated along a distinct propagation path through a portion of the D-region of the ionosphere corresponding to one or more of the plurality of grid pixels; clustering the plurality of electromagnetic signals based on similarities in a point-of-origin of the plurality of electromagnetic signals to generate a plurality of clustered signals, each of the plurality of clustered signals representative of a clustered path from a point of origin to one of the plurality of receivers through one or more of the plurality of grid pixels; determining a path-averaged electron density curve for each of the plurality of clustered signals; determining a basis representation of an electron density curve of the plurality of grid pixels, the basis representation consistent with the plurality of path-averaged electron density curves; and generating, based at least in part on the basis representation, an electron density map for the at least a portion of the D-region of the ionosphere.

In any of the embodiments disclosed herein, determining the basis representation of the electron density curve of the plurality of grid pixels can comprise applying a discrete cosine transform to the plurality of path-averaged electron density curves to obtain a discrete cosine transform coefficient for each of the plurality of grid pixels, and wherein generating the electron density map is based, at least in part on the discrete cosine transform coefficients.

In any of the embodiments disclosed herein, determining the path-averaged electron density curve for each of the plurality of clustered signals can comprise selecting a best-fitting electron density curve from a plurality of pre-determined electron density curves.

In any of the embodiments disclosed herein, the plurality of electromagnetic signals can be generated by lightning strikes.

In any of the embodiments disclosed herein, the plurality of electromagnetic signals can be generated by very low frequency ("VLF") transmitters.

In any of the embodiments disclosed herein, the electron-density map can be a three-dimensional map having longitude, latitude, and altitude dimensions.

In any of the embodiments disclosed herein, the electron-density map can be a four-dimensional map having longitude, latitude, altitude, and time dimensions.

In any of the embodiments disclosed herein, the similarities in a point-of-origin of the plurality of electromagnetic signals can include similarities in the latitude and longitude of the point-of-origin of the plurality of electromagnetic signals.

In any of the embodiments disclosed herein, the similarities in the point-of-origin of the plurality of electromagnetic signals can include similarities in the latitude, longitude, and altitude of the point-of-origin of the plurality of electromagnetic signals.

In any of the embodiments disclosed herein, the clustering the plurality of electromagnetic signals can be further based on similarities in time of origination of the plurality of electromagnetic signals.

In any of the embodiments disclosed herein, the method can further comprise using the electron-density map to determine an effect of the D-region of the ionosphere on an electromagnetic signal to be transmitted from a first transmitter to a first receiver.

In any of the embodiments disclosed herein, the method can further comprise altering, based on the determined effect, a characteristic of the electromagnetic signal to be transmitted from the first transmitter to the first receiver.

In any of the embodiments disclosed herein, the method can further comprise transmitting the electromagnetic signal with the altered characteristic from the first transmitter to the first receiver.

In any of the embodiments disclosed herein, receiving a plurality of electromagnetic signals at a plurality of receivers can comprise measuring a magnetic field of each of the electromagnetic signals at the plurality of receivers.

In any of the embodiments disclosed herein, each of the plurality of electromagnetic signals can include part of a frequency of 0.5-500 kHz.

In any of the embodiments disclosed herein, the D-region of the ionosphere can have an altitude of 40-100 km.

In any of the embodiments disclosed herein, the discrete cosine transform can be a two-dimensional discrete cosine transform.

Another embodiment of the present disclosure provides a system for generating an electron density map of an ionosphere, in which the ionosphere comprises a D-region. The system can comprise a processor and memory. The memory can comprise instructions that when executed by the processor, cause the system to: define a plurality of grid pixels corresponding to at least a portion of the D-region of the ionosphere, each of the grid pixels having a substantially equal size in longitude and latitude; receive data indicative of a plurality of electromagnetic signals at a plurality of receivers, each of the plurality of electromagnetic signals having propagated along a distinct propagation path through a portion of the D-region of the ionosphere corresponding to one or more of the plurality of grid pixels; cluster the plurality of electromagnetic signals based on similarities in a point-of-origin of the plurality of electromagnetic signals to generate a plurality of clustered signals, each of the plurality of clustered signals representative of a clustered path from a point of origin to one of the plurality of receivers through one or more of the plurality of grid pixels; determine a path-averaged electron density curve for each of the plurality of clustered signals; determine a basis representation of an electron density curve of the plurality of grid pixels, the basis representation consistent with the plurality of path-averaged electron density curves; and generate, based at least in part on the basis representation, an electron density map for the at least a portion of the D-region of the ionosphere.

In any of the embodiments disclosed herein, the instructions, when executed by the processor, can cause the system to determine the basis representation of the electron density curve, at least in part, by applying a discrete cosine transform to the plurality of path-averaged electron density curves to obtain a discrete cosine transform coefficient for each of the plurality of grid pixels, and wherein the electron density map is generated at least in part based on the discrete cosine transform coefficients.

In any of the embodiments disclosed herein, the instructions, when executed by the system, can cause the processor to determine the path-averaged electron density curve for each of the plurality of clustered signals, at least in part, by selecting a best-fitting electron density curve from a plurality of pre-determined electron density curves.

In any of the embodiments disclosed herein, the instructions, when executed by the processor, can cause the system to cluster the plurality of electromagnetic signals further based on similarities in time of origination of the plurality of electromagnetic signals.

In any of the embodiments disclosed herein, the instructions, when executed by the processor, can cause the system to use the electron-density map to determine an effect of the D-region of the ionosphere on an electromagnetic signal to be transmitted from a first transmitter to a first receiver.

In any of the embodiments disclosed herein, the instructions, when executed by the processor, can cause the system to alter, based on the determined effect, a characteristic of the electromagnetic signal to be transmitted from the first transmitter to the first receiver.

In any of the embodiments disclosed herein, the instructions, when executed by the processor, can cause the system to transmit the electromagnetic signal with the altered characteristic from the first transmitter to the first receiver.

In any of the embodiments disclosed herein, the instructions, when executed by the processor, can cause the system to measure a magnetic field of each of the electromagnetic signals received at the plurality of receivers.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 2A is the assumed ionosphere displayed with 0.1° by 0.1° latitude/longitude pixel size. FIG. 2B is the reconstruction with clipped values exceeding the range of the original. FIG. 2C shows the difference between the original and reconstructed synthetic ionospheric feature map.

FIG. 3A is the assumed ionosphere displayed with 0.1° by 0.1° latitude/longitude pixel size. FIG. 3B is the reconstruction with clipped values exceeding the range of the original. FIG. 3C shows the difference between the original and reconstructed synthetic ionospheric feature map.

FIG. 4A is the assumed ionosphere displayed with 0.1° by 0.1° latitude/longitude pixel size. FIG. 4B is the reconstruction with clipped values exceeding the range of the original. FIG. 4C shows the difference between the original and reconstructed synthetic ionospheric feature map.

FIGS. 5A-C illustrate the performance of a DCT basis D region tomography algorithm with moderately noisy inferences and Tikhonov regularization, in accordance with some embodiments of the present disclosure. FIG. 5A is the assumed ionosphere displayed with 0.1° by 0.1° latitude/longitude pixel size. FIG. 5B is the reconstruction with clipped values exceeding the range of the original. FIG. 5C shows the difference between the original and reconstructed synthetic ionospheric feature map.

FIGS. 6A-D illustrate performance of a DCT-based D region imaging approach with BPDN for three error profiles, in accordance with some embodiments of the present disclosure.

FIGS. 7A, 7C, and 7E show results from the daytime case from 20:00 to 20:05 UT. FIGS. 7B, 7D, and 7F show nighttime results from 2:00 to 2:05 UT. FIGS. 7A-B are example maps with relevant data, including the source-to-receiver paths used to produce the image, color-coded example trace locations and the geographical region used to produce the 3D image during each time slice. FIGS. 7C-D show example traces for each case corresponding to the map. FIGS. 7E-F show relevant isosurfaces for electron densities important to VLF propagation.

FIGS. 8A, 8C, and 8E show results from the sunset case from 1:05 to 1:10 UT. FIGS. 8B, 8D, and 8F show sunrise results from 10:55 to 11:00 UT. FIGS. 8A-B are example maps with relevant data, including the source-to-receiver paths used to produce the image, color-coded example trace locations and the geographical region used to produce the 3D image for each time slice, and also shows the terminator as a bold black line and the portion of the map in the dark. FIGS. 8C-D show example traces for each case corresponding to the map. FIGS. 8E-F show relevant isosurfaces for electron densities important to VLF propagation.

FIG. 10A is the assumed ionosphere with a 2° by 2° latitude/longitude pixel size. FIG. 10B is the reconstruction with clipped values exceeding the range of the original. FIG. 10C shows the difference between the original and reconstructed synthetic ionospheric feature map.

FIG. 11A is the assumed ionosphere with a 2° by 2° latitude/longitude pixel size. FIG. 11B is the reconstruction with clipped values exceeding the range of the original. FIG. 11C shows the difference between the original and reconstructed synthetic ionospheric feature map.

FIG. 12A is the assumed ionosphere with a 2° by 2° latitude/longitude pixel size. FIG. 12B is the reconstruction with clipped values exceeding the range of the original. FIG. 12C shows the difference between the original and reconstructed synthetic ionospheric feature map.

FIG. 13A is the assumed ionosphere with a 2° by 2° latitude/longitude pixel size. FIG. 13B is the reconstruction with clipped values exceeding the range of the original. FIG. 13C shows the difference between the original and reconstructed synthetic ionospheric feature map.

DETAILED DESCRIPTION

Figure 1:
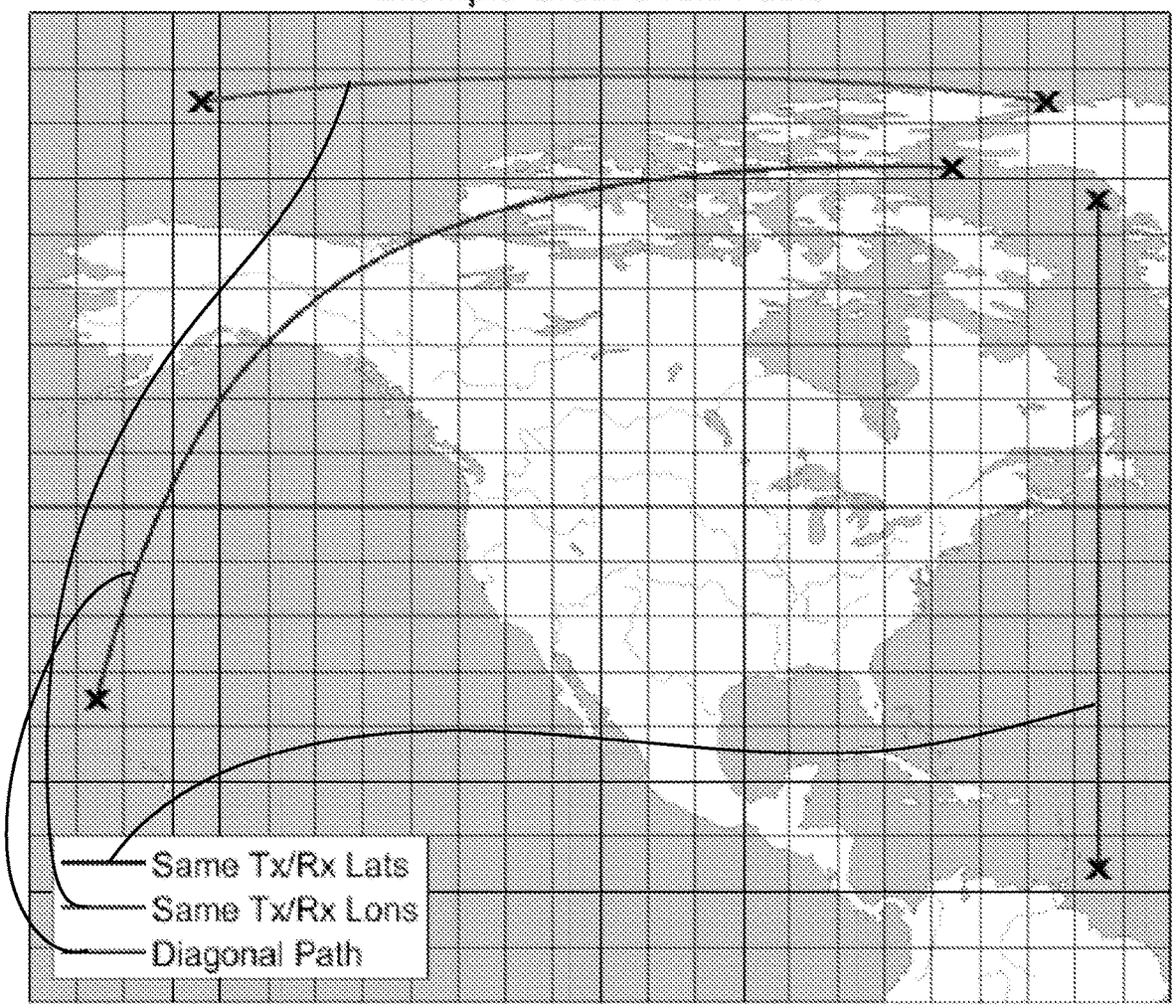
FIG. 1 illustrates curvilinear great circle paths overlaid onto the equirectangular projection, in accordance with some embodiments of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Embodiments of the present disclose provide methods for generating an electron density map of the D-region of the ionosphere. The method can begin with defining a defining a plurality of grid pixels corresponding to at least a portion of the D-region of the ionosphere. That is, the D-region of the ionosphere, or a portion thereof, can be geographically separated into a plurality of "pixels." Each of the grid pixels can have a substantially equal size in longitude and latitude. For example, each pixel may correspond to a longitude of 2 degrees and a latitude of 4 degrees. As discussed in the examples below, in some embodiments, the edges of each pixel can be curvilinear to account for the geometrical shape of Earth.

The method can further comprise receiving a plurality of electromagnetic signals at a plurality of receivers. The electromagnetic signals can be generated from many different sources. For example, in some embodiments, the electromagnetic signals are the result of lightning strikes. In some embodiments, the electromagnetic signals can be generated by VLF frequency transmitters, such as the beacons used by the US Navy. The electromagnetic signals can have a wide range of frequency components. For example, in some embodiments, of the plurality of electromagnetic signals can include part of a frequency of 0.5-500 kHz. Each of the plurality of electromagnetic signals can have propagated from its point-of-origin (e.g., source of lightning, ground-based transmitter, satellite-based transmitter, etc.) to the respective receiver along a distinct propagation path. The propagation path includes at least a portion of the D-region of the ionosphere corresponding to one or more of the plurality of grid pixels. In some embodiments, the magnetic field of each of the electromagnetic signals is measured at the respective receiver.

The method further comprises clustering the plurality of electromagnetic signals based on similarities in a point-of-origin of the plurality of electromagnetic signals to generate a plurality of clustered signals. Each of the plurality of clustered signals can represent a clustered path from a point of origin to one of the plurality of receivers through one or more of the plurality of grid pixels. The similarities in a point-of-origin of the plurality of electromagnetic signals can include similarities in one or more of the latitude, longitude, altitude, and point in time of the point-of-origin of the plurality of electromagnetic signals. For example, if multiple lightning strikes originated at a similar point in time from a similar location (latitude, longitude, and altitude), such that electromagnetic signals generated from those strikes propagate through a first similar (or the same) group of pixels to a first receiver can be represented by a first clustered signal, and electromagnetic signals generated from those strikes propagate through a second similar (or the same) group of pixels to a second receiver can be represented by a second clustered signal. Similarly, other lightning strikes with different common time and location characteristics can generate signals to the first and second receivers that can be similarly represented by third and fourth clustered signals.

The method can further comprise determining a path-averaged electron density curve for each of the plurality of clustered signals. As would be appreciated by persons of ordinary skill in the art, there are many known techniques for determining a path-averaged electron density curve, any of which can be used in various embodiments of the present disclosure. In some embodiments, determining the path-averaged electron density curve for each of the plurality of clustered signals can comprise selecting a best-fitting electron density curve from a plurality of pre-determined electron density curves. For example, there are approximately 359 different known electron density curves for the D-region of the ionosphere. Thus, in some embodiments, one of these known electron density curves that is the best fit can be selected for each clustered signal.

Having an estimate of the electron density curve along the path corresponding to each of the clustered signals, a basis representation that is consistent with the plurality of path-averaged electron density curves can then be determined which will represent the electron density curve for each of the pixels in the D-region of the ionosphere. Many different basis representations can be employed in various embodiments of the present disclosure. In some embodiment, determining the basis representation of the electron density curve of the plurality of grid pixels can comprise applying a discrete cosine transform to the plurality of path-averaged electron density curves to obtain a discrete cosine transform coefficient for each of the plurality of grid pixels. The discrete cosine transform can be a two-dimensional discrete cosine transform The method can further comprise generating, based at least in part on the basis representation, an electron density map for the portion of the D-region of the ionosphere. In some embodiments, the electron-density map can be a three-dimensional map having longitude, latitude, and altitude dimensions. In some embodiments, the electron-density map can be a four-dimensional map having longitude, latitude, altitude, and time dimensions.

The generated electron-density map can then be displayed, e.g., to a user on a display, to illustrate the effect of D-region on various signals that might be transmitted. Thus, prior to transmission, these effects can be estimated, and the signal be adjusted to account for the effect of the ionosphere. Accordingly, in some embodiments, the method can further comprise using the electron-density map to determine an effect of the D-region of the ionosphere on an electromagnetic signal to be transmitted from a first transmitter to a first receiver. The method can also further comprise altering, based on the determined effect, a characteristic of the electromagnetic signal to be transmitted from the first transmitter to the first receiver. The method can further comprise transmitting the electromagnetic signal with the altered characteristic from the first transmitter to the first receiver.

The present disclosure also provides systems for implementing any of the methods disclosed herein. For example, the system can comprise a processor and memory. The memory can comprise instructions, that when executed by the processor, can cause the system to carry out any of the methods disclosed herein. In some embodiments, the system can also disclose a display for displaying the electron-density map.

The following examples further illustrate aspects of the present disclosure. However, they are in no way a limitation of the teachings or disclosure of the present disclosure as set forth herein.

EXAMPLES

Measurement Geometry

We represent the D region of the ionosphere as square pixels in latitude/longitude space for a set altitude. Each path is curvilinear along the latitude/longitude grid. Because the Earth is an oblate spheroid, we use an accurate geodesic solution for high accuracy of path calculations. The effect of Earth's curvature on great circle paths can be seen in FIG. 1, where distortion of paths from the straight lines are worse for higher latitudes. Furthermore, the pixel dimensions are not equal in length and they are not completely square in terms of geographical lengths. In the highest row, 85 latitude, the squares have length 49 km and height 558 km. In the lower row, corresponding to 0 latitude, the squares have length 557 km and height 553 km. As such, we account the varying size and shape of each pixel.

The example map uses the equirectangular projection, a map projection that contains grid lines of constant latitude/longitude, which is the most direct comparison to square pixel images. The information about the image from each path is distributed along the image pixels in which it crosses, and importance of each respective pixel is proportional its crossing line segment. We take the D region to be smoothly varying over large geographical regions. In this spirit, we employ a 2D discrete cosine transform, or DCT. The DCT is a basis representation of a signal related to the discrete Fourier transform, differing in that it only uses real valued weights. The form of the DCT used in this example is written as:

$$A_{mn} = \sum_{p=0}^{M-1} \sum_{q=0}^{N-1} \alpha_p \gamma_q B_{pq} \cos\left(\frac{\pi(2m+1)p}{2M}\right) \cos\left(\frac{\pi(2n+1)q}{2N}\right), \begin{array}{l} 0 \le m \le M-1 \\ 0 \le n \le N-1 \end{array}$$

where:

$$\alpha_p = \begin{cases} \frac{1}{\sqrt{M}}, & p = 0 \\ \sqrt{\frac{2}{M}}, & 1 \le p \le M-1 \end{cases}$$

$$\gamma_q = \begin{cases} \frac{1}{\sqrt{N}}, & q = 0 \\ \sqrt{\frac{2}{N}}, & 1 \le q \le N-1 \end{cases}$$

and $B_{pq}$ are the DCT coefficients.

The line integral of a single ionospheric measurement can be written as:

$$v = Le = \int_c I(\theta, \phi) ds,$$

where I is some ionospheric value function defined for θ as latitude and φ as longitude. e is a path-averaged inferred value along a path of length L. We then represent I as a basis expansion of DCT coefficients and take each measurement as a line-integral along the DCT expansion replacing θ for m and φ for n written as:

$$v = \int_c \sum_{p=0}^{M-1} \sum_{q=1}^{N-1} \alpha_p \gamma_q B_{pq} \cos\left(\frac{\pi(2\theta(r)+1)p}{2M}\right) \cos\left(\frac{\pi(2\phi(r)+1)q}{2N}\right) ds$$

To perform the integration, we use the trapezoid numerical technique. For R segments, the approximate integration can be expressed as:

$$\simeq \sum_{r=1}^{R} \sum_{p=0}^{M-1} \sum_{q=0}^{N-1} \left[ \alpha_p \gamma_q B_{pq} \cos\left(\frac{\pi(2\theta(r)+1)p}{2M}\right) \cos\left(\frac{\pi(2\phi(r)+1)q}{2N}\right) + \cos\left(\frac{\pi(2\theta(r)+1)p}{2M}\right) \cos\left(\frac{\pi(2\phi(r)+1)q}{2N}\right) \right] \left(\frac{\Delta \ell(r)}{2}\right)$$

We can rewrite and rearrange terms to make:

$$\sum_{p=0}^{M-1} \sum_{q=0}^{N-1} B_{pq} \sum_{r=1}^{R} K_r \Delta \ell(r) \left(\frac{\alpha_p \gamma_q}{2}\right) \cos\left(\frac{\pi(2\theta(r)+1)p}{2M}\right) \cos\left(\frac{\pi(2\phi(r)+1)q}{2N}\right),$$

which can be written as vectorized product between p*q DCT coefficients ($B_{pq}$) and the rest of the line integral term and where:

$$K_r = \begin{cases} 1, & r = 1, R \\ 2, & 2 \le r \le R-1 \end{cases}$$

By adding more line integral observations, we arrive at a measurement system as follows:

$$v = AB$$

where B is the vectorized matrix of DCT coefficients and is the vector of all line measurements in the source-to-receiver system. With the image specified by the DCT coefficients, an arbitrary image can be produced. Next, we give example performance for some regularization techniques. For each case, we consider the same example constellation of VLF source locations shown in FIGS. 2A-C for an image target range of 5° to 45° and −120° to −60° latitude/longitude with 0.1° spacing. We solve for the underlying image with the singular value decomposition method.

In order to examine the effect of error on the imaging algorithms, we will consider synthetically generated ionospheres with randomly generated errors. We generate random maps of an ionospheric "feature." Next, we synthesize the path integral measurements by calculating along the assumed ionosphere. This ionospheric feature is a proxy for the electron density at a specific altitude, the output of this algorithm. For this case, we choose a value of 15. On top of the center value, we superimpose the summation of 50 random 2D Gaussian functions in the form of:

$$f(\phi, \theta) = A \exp\left(-\left(\frac{(\theta - \theta_0)^2}{2\sigma_\theta^2} + \frac{(\phi - \phi_0)^2}{2\sigma_\phi^2}\right)\right),$$

where θ is latitude, φ is longitude, A is amplitude, and σ are the standard deviations. For each Gaussian, we choose a random center value ($\phi_0$, $\theta_0$) from a uniform random distribution over the image target. Similarly, we choose A uniformly from the range [−5,5], and both σ from [6,12].

Figures 2A, 2B, 2C:
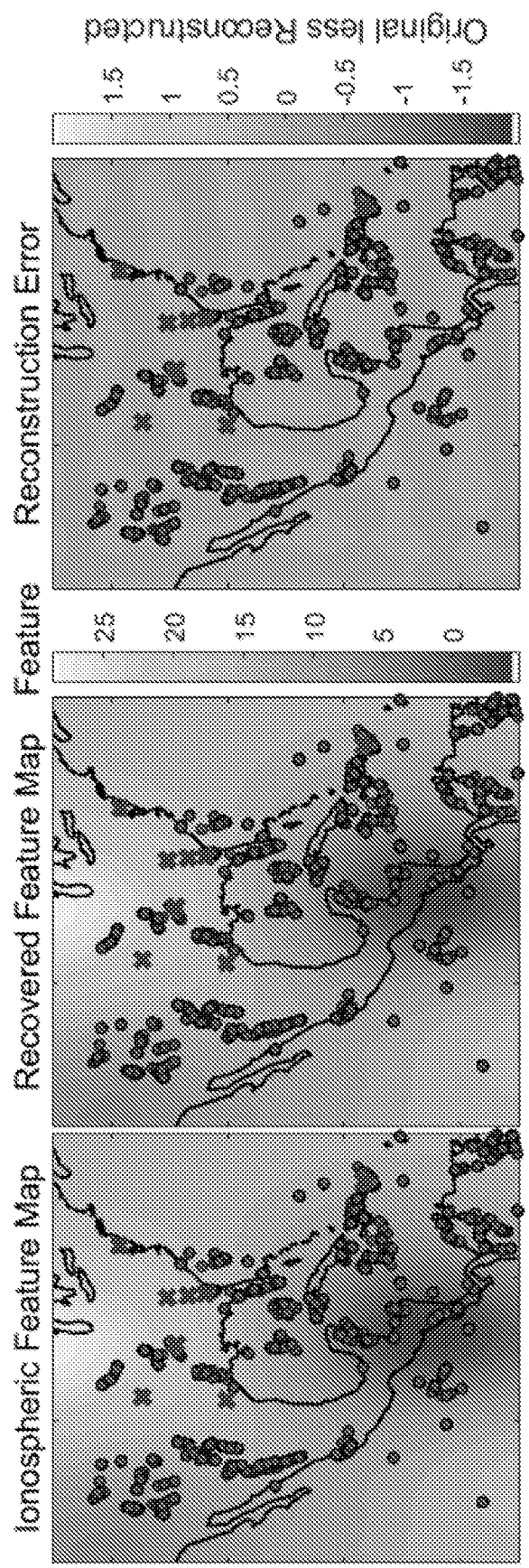
FIGS. 2A-C illustrate the performance of a DCT basis D region tomography algorithm with noiseless inferences, in accordance with some embodiments of the present disclosure.

We begin with the noiseless case in FIGS. 2A-C. The algorithm can accurately reconstruct the entire image even outside of the bounds of the measurements. This is possible due to the noiseless synthetic measurements taken with the fact that the reconstruction can accurately determine the DCT coefficients. Because the Gaussian synthetic image generation creates a smoothly varying ionosphere, it is well represented by a small number of low frequency DCT components. Therefore, the image is correct even outside of the measurement region because the DCT basis is a unique representation of the image.

Figures 3A, 3B, 3C:
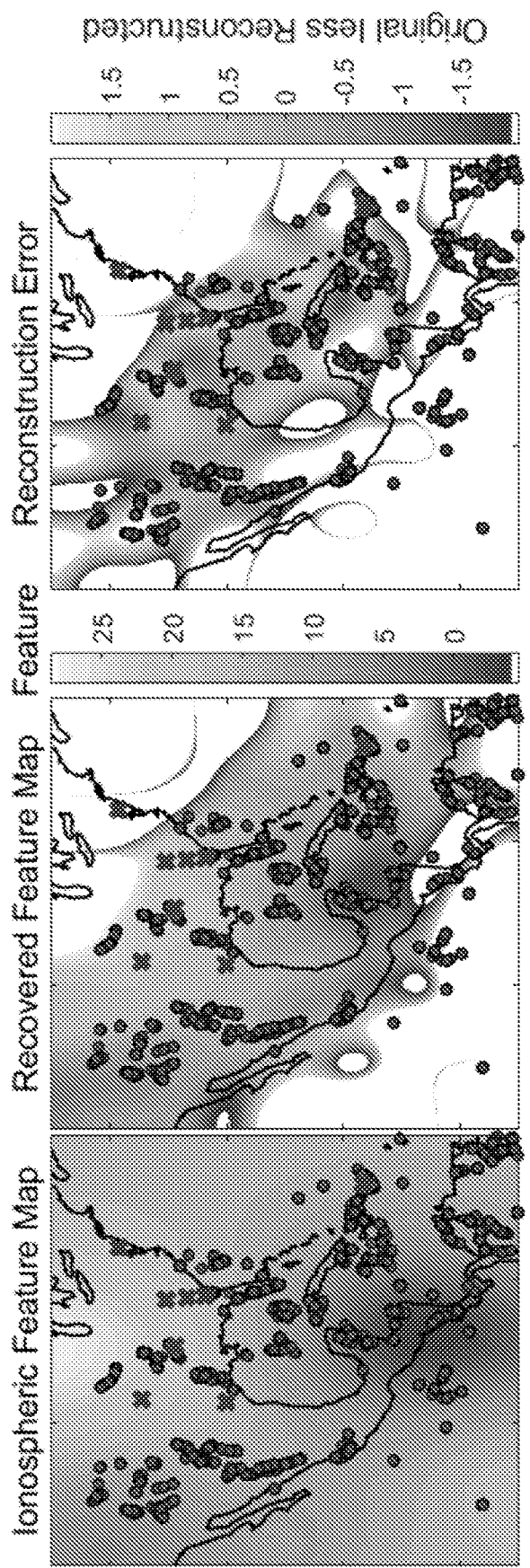
FIGS. 3A-C illustrate the performance of a DCT basis D region tomography algorithm with moderately noisy inferences, in accordance with some embodiments of the present disclosure.

Next, we consider the effect of noisy measurements on image reconstruction performance. We will consider three error profiles: small, with a variation of 2.1; moderate, with a variation of 3.2; and extreme, with a variation of 8. First, we consider the effect of the moderate noise profile in FIGS. 3A-C. The added noise degrades the imaging performance as expected, however, but is still capable of accurate reconstruction in portions of the image.

Figures 4A, 4B, 4C:
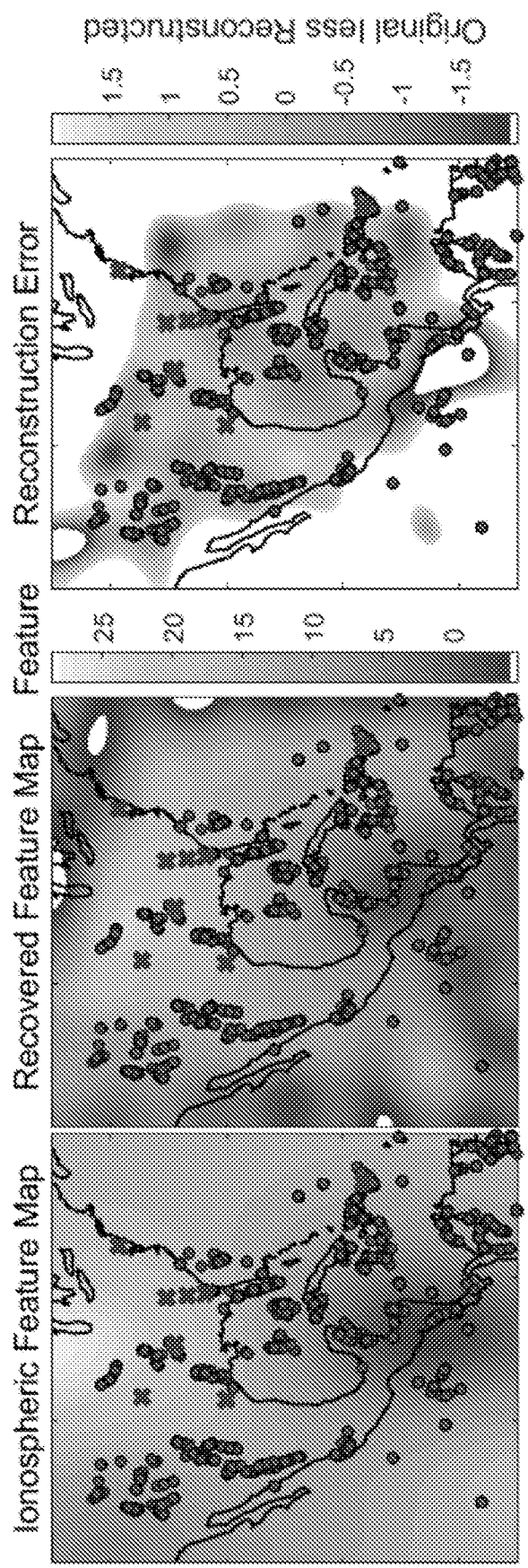
FIGS. 4A-C illustrate the performance of a DCT basis D region tomography algorithm with noiseless inferences and Tikhonov regularization, in accordance with some embodiments of the present disclosure.
Figures 7A, 7B:
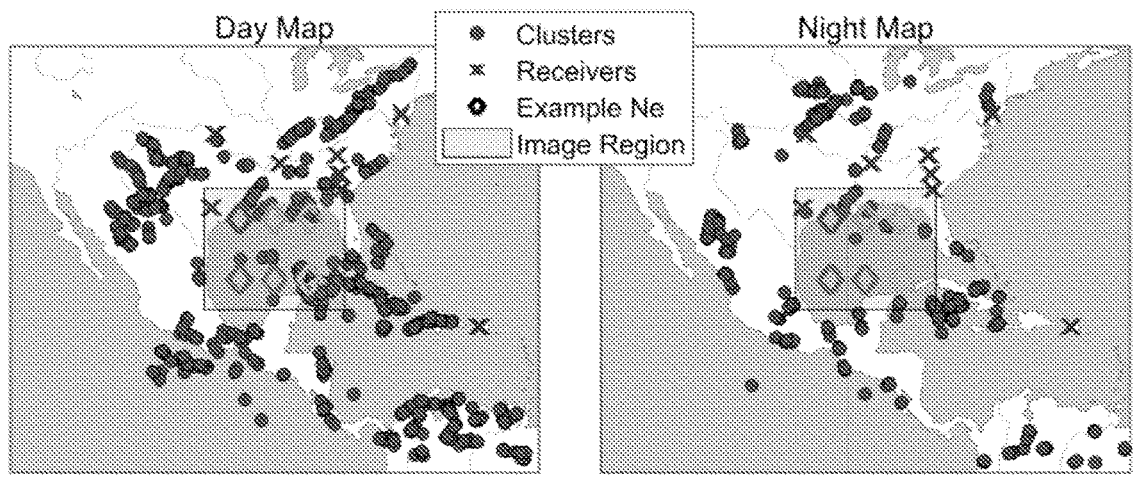
FIGS. 7A-F provide day and night images, in accordance with some embodiments of the present disclosure.
Figures 7C, 7D:
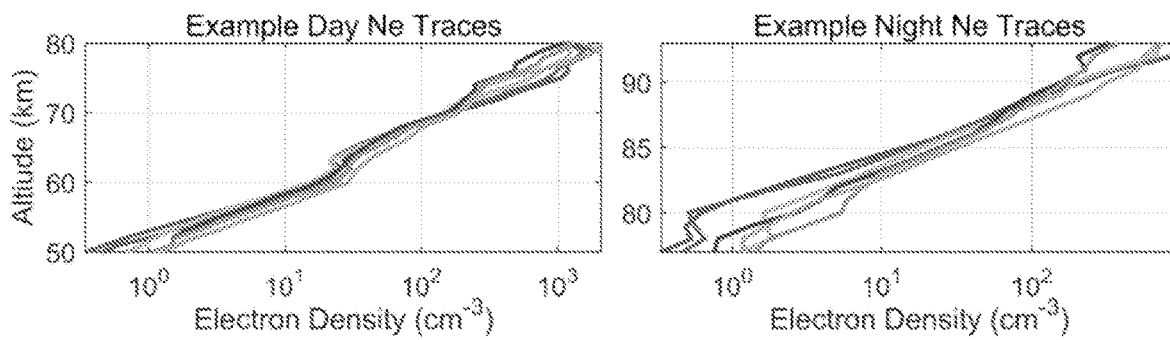
Figures 7E, 7F:
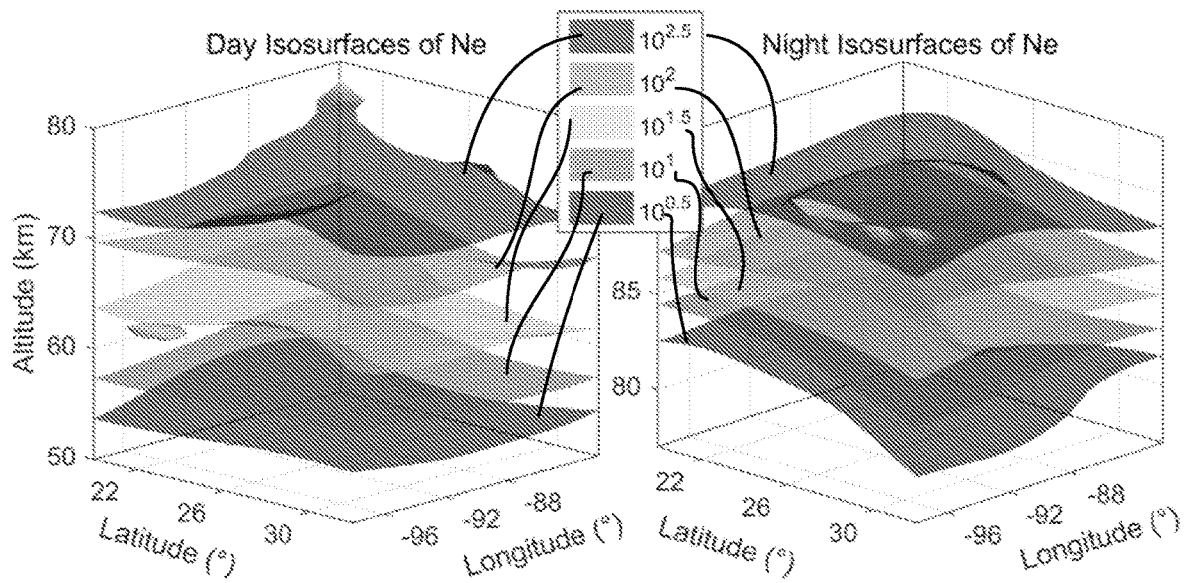
Figures 8A, 8B:
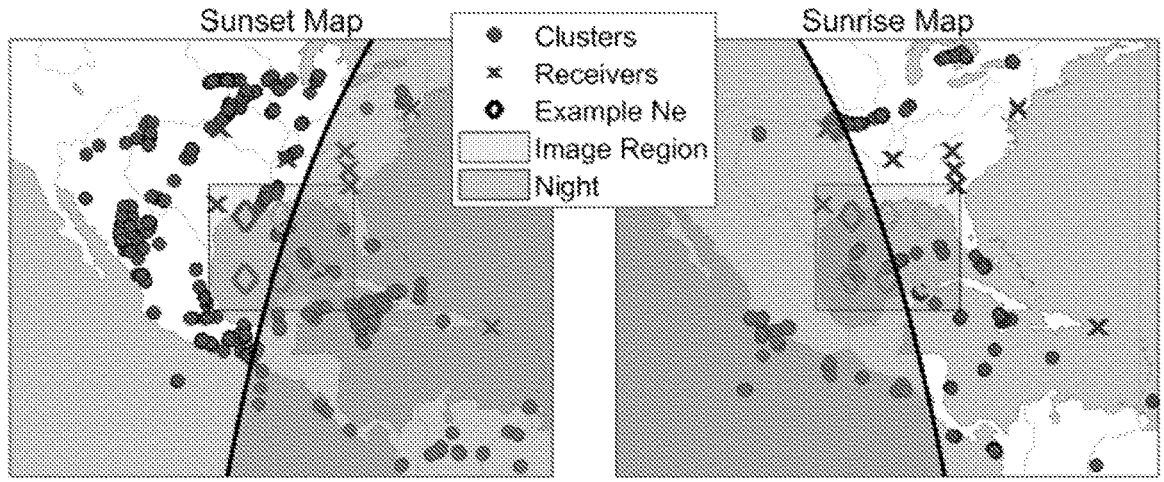
FIGS. 8A-F provide sunset and sunrise images, in accordance with some embodiments of the present disclosure.
Figures 8C, 8D:
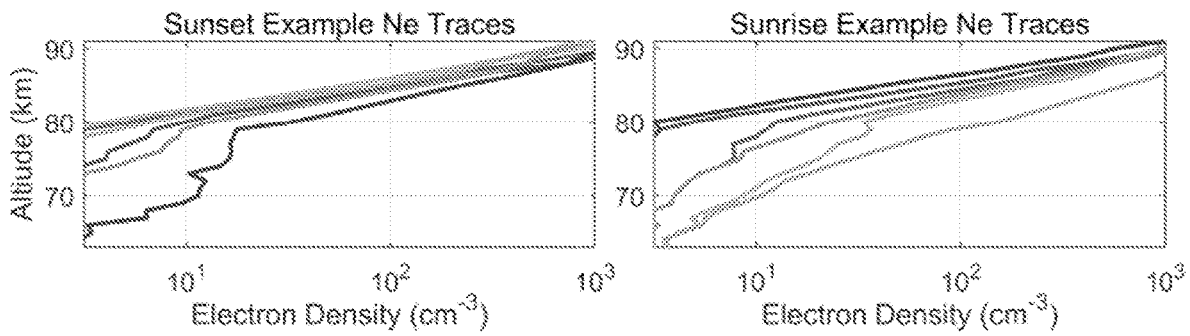
Figures 8E, 8F:
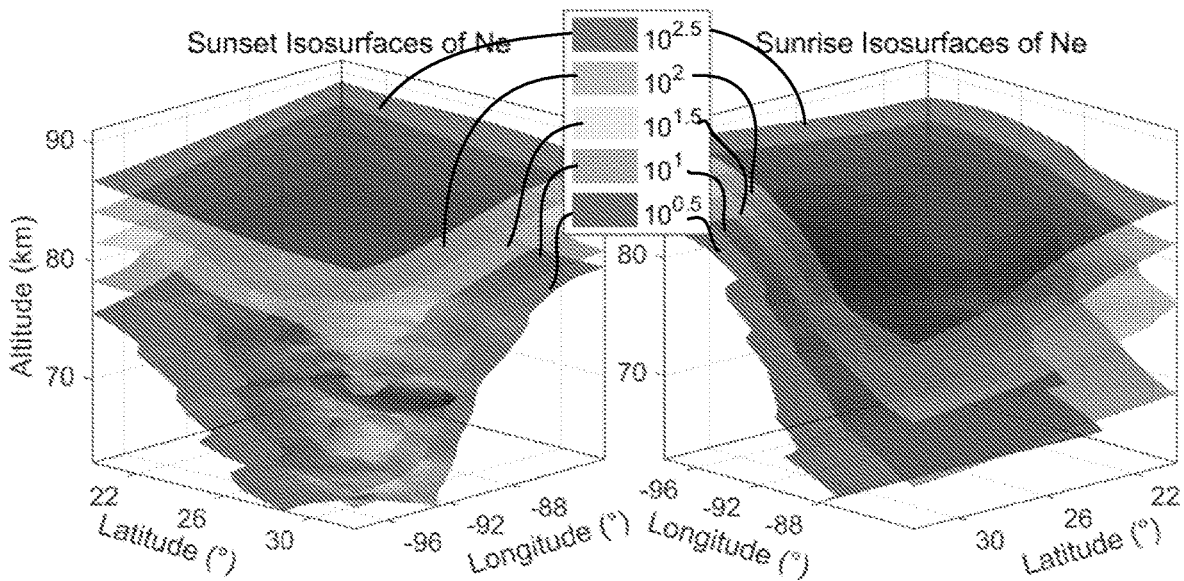

Next, we consider the effect of Tikhonov regularization on the DCT reconstruction in the absence of noise in FIGS. 4A-C. We show an example with a relatively large value for δ=$10^5$. Tikhonov regularization seems to have a similar effect on the DCT basis reconstruction to the pixel basis. In particular, the area with a valid solution shrinks with increasing δ to the region that is better covered with transmitter-to-receiver paths.

Finally, we consider the moderate error case with Tikhonov regularization for δ=1000 in FIGS. 5A-C. Tikhonov regularization with the moderately noisy case significantly increases performance. The acceptable reconstructed image area is similar in size to case without noise, again demonstrating the noise resiliency of the DCT basis for D region tomography. Tikhonov regularization effectively controls the tradeoff between high energy singular value contributions and the accuracy of the best-fit solution, which can be perturbed by noise. However, there are many methods of regularization with different tradeoffs.

For the final version of D Region Tomography, we use basis pursuit denoising (BPDN) algorithm to perform imaging. BPDN controls the tradeoff between the best least squares solution and a sparse solution (i.e. the total value of the DCT coefficients). Smooth solutions tend to have most of the energy in the low frequency components which may allow for an adequate solution even with only a small set of DCT reconstructed components. BPDN solves the optimization problem given by:

$$\min_B \frac{1}{2}\|v - AB\|_2^2 + \lambda\|B\|_1$$

where $\lambda$ is the regularization parameter which controls the tradeoff between forcing a sparse solution and best agreement to the measurements. With $\lambda$ set too low, we risk overfitting the solution to the data but too high and the solution will be "too sparse."

We show an imaging example for all three error profiles in FIGS. 6B-D. All the examples use the DCT basis with BPDN, and each assumes the 100 lowest DCT frequency components. The initial random ionosphere is shown in the top-left panel with the difference between the original and reconstructed ionospheres shown in the next three panels. The imaging performance degrades as we increase the magnitude of errors, but even for the extreme case, good performance is achieved over the Gulf of Mexico. Therefore, we consider this region for the imaging results discussed in the next section.

To extend the D region tomography to 4 dimensions, we perform the imaging at each relevant altitude and time step. With this method, each time solution is in principle independent from the next. The solution at each altitude could also be viewed as independent, with a couple of caveats. First, the inversion technique for the electron density profile is not freely varying, so there is effectively an altitude constraint. Secondly, by forcing smooth solutions via the DCT basis, there is a spatial constraint on the solutions. These constraints will help yield a reasonable solution. To further help with a well-conditioned problem at each altitude, we only consider profiles with electron density within an order of magnitude of the sensitive range, namely from 0.1-10000 cm$^{-3}$.

D Region Tomography Example Results

For the example results, we consider cases where the ionosphere is known to vary due to diurnal effects. The imaging examples in this section use the BPDN method with $\lambda=3\times10^5$ assuming a solution with only the 100 lowest frequency DCT components. First, we consider some examples of the inferred electron density from day and night with time windows of 300 seconds on 22 Aug. 2017 starting at 20 and 2 UT respectively. These results are shown in FIGS. 7A-F.

The left column shows the day case and the right column shows the night case. The maps show the locations of imaged example electron density traces which are displayed in the middle row. The map also shows the region that we have empirically determined capable of producing an image, even in the extreme noise case (as seen in the example of FIG. 6). As expected, the daytime traces are much lower than the nighttime profiles and not as sharp. In contrast, the nighttime profiles are higher in altitude, sharper, and appear more log-linear. The nighttime example traces show slightly more variation in the image region than the daytime examples. The bottom row shows selected isosurfaces in the sensitive electron density range. Both sets of isosurfaces vary over the region, but neither have any sharp or dominant features.

To contrast the relative steadiness over the image region for all day or night, we consider a case with known variation: the day-night terminator. For our purposes, the terminator occurs when the sun sets at 80 km, a height at which the electron density is important for VLF propagation at all times. As the ionizing solar flux dissipates, especially as the terminator passes over a region, the lower ionosphere quickly recombines effectively moving the D-region higher. The figure format is the same as in FIGS. 8A-F. The sunset case appears more turbulent which is especially visible in the isosurface plot. In contrast, the sunrise case appears smoother, but sharper, indicating that the ionizing action is faster than recombination and that it may be a non-reciprocal process.

While the above describes a DCT basis representation, other techniques and methods can also be used. One such technique is described below.

D Region Tomography with Pixel Representation

Figure 9:
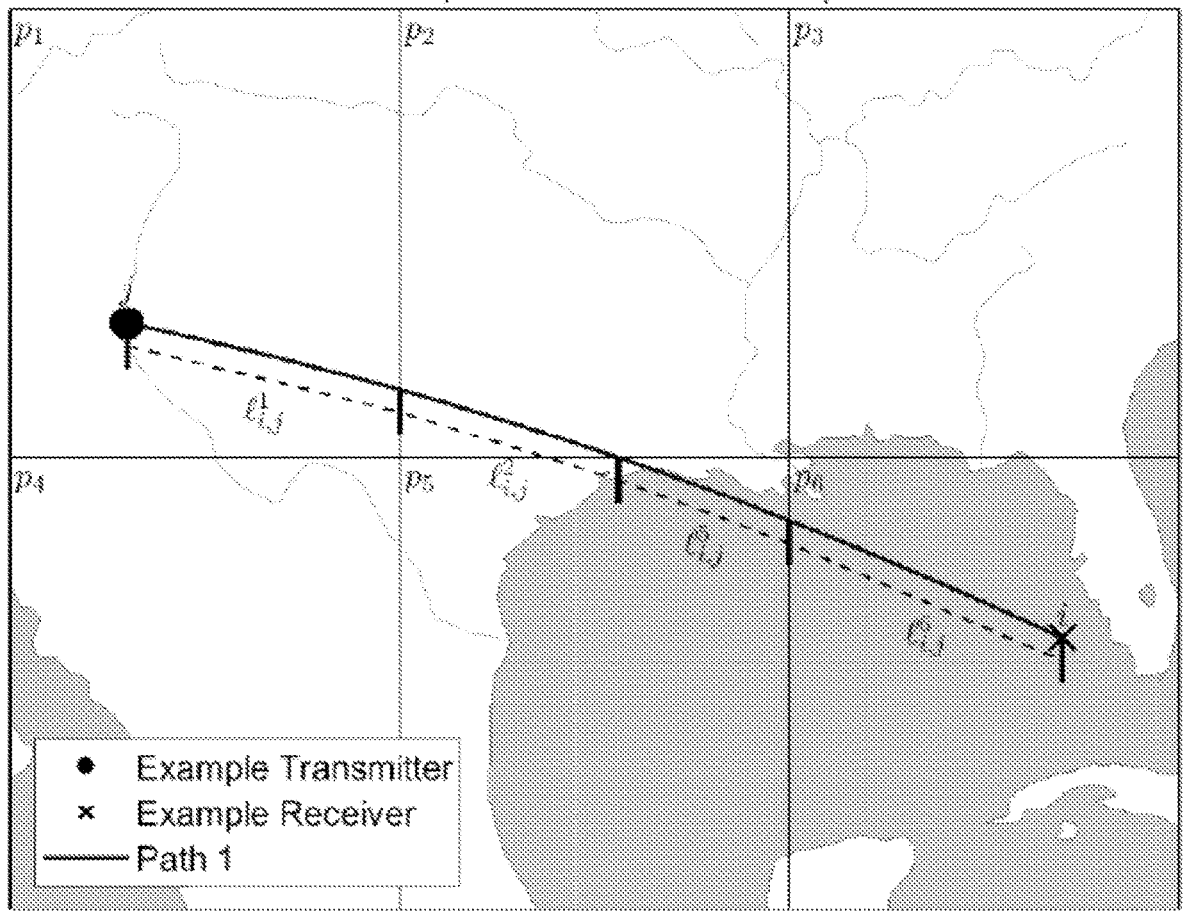
FIG. 9 provides measurement geometry for the pixel-based D region tomography method, in accordance with some embodiments of the present disclosure. Paths are overlaid on an example map to show the scale of curvature of the great circle paths.

In the pixel basis technique, the information about the image from each path is distributed along the image pixels in which it crosses, and the importance of each respective pixel is proportional to its crossing line segment. FIG. 9 shows an example of a potential measurement setup for D region tomography with a pixel basis with a small number of paths and receivers with 5° latitude/longitude spacing. The measurement scheme can be written as a matrix-vector product as:

$$y=Ax$$

where A represents the line-integral operator against some underlying image x, and y are the line-integral inferences (or path averaged measurement times the respective path length). A is an M by N matrix with M=I·J, where I is the number of receivers and J is the number of lightning clusters. N is the number of pixels in the target image (the image is vectorized to complete the matrix multiplication). Each entry represents the respective pixel's contribution to a line-integral measurement. We can write the example from FIG. 9 as:

$$[y_m] = \begin{bmatrix} \ell_{i,j}^1 & \ell_{i,j}^2 & 0 & 0 & \ell_{i,j}^5 & \ell_{i,j}^6 \end{bmatrix} \begin{bmatrix} p_1 \\ p_2 \\ p_3 \\ p_4 \\ p_5 \\ p_6 \end{bmatrix}$$

where $y_m$ are the line-integral measurements and $\ell_{i,j}^n$ are the line segments present in the respective pixels $p_n$ for the $i^{th}$ receiver and the $j^{th}$ cluster. In order to investigate the performance of the pixel basis image reconstruction technique, we consider an assumed ionosphere and the performance of synthetic data as above.

For each case, we consider the same constellation of VLF source clusters for the image target range of 5° to 45° and −120° to −60° latitude/longitude with 2° spacing. For the following cases, we calculate the path pixel segments as in the example of FIG. 9. We solve for the underlying image with the singular value decomposition method.

Figures 10A, 10B, 10C:
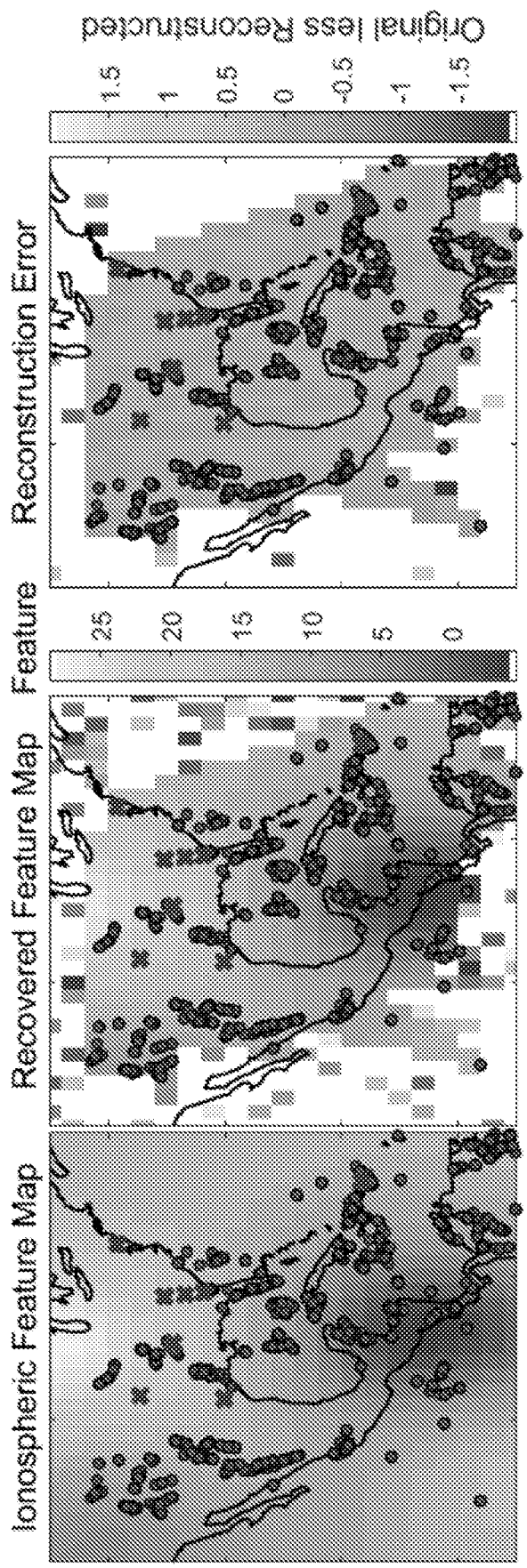
FIGS. 10A-C illustrates the performance of the pixel basis D region tomography algorithm with noiseless inferences, in accordance with some embodiments of the present disclosure.

First, we consider the performance of the noiseless case in FIGS. 10A-C. The algorithm is able to accurately reconstruct the image in the region defined by all pixels crossed by one or more transmitter-to-receiver path. Outside of this range there is no constraining information therefore an infinite number of solutions exists and small singular values will cause it to blow up.

Figures 11A, 11B, 11C:
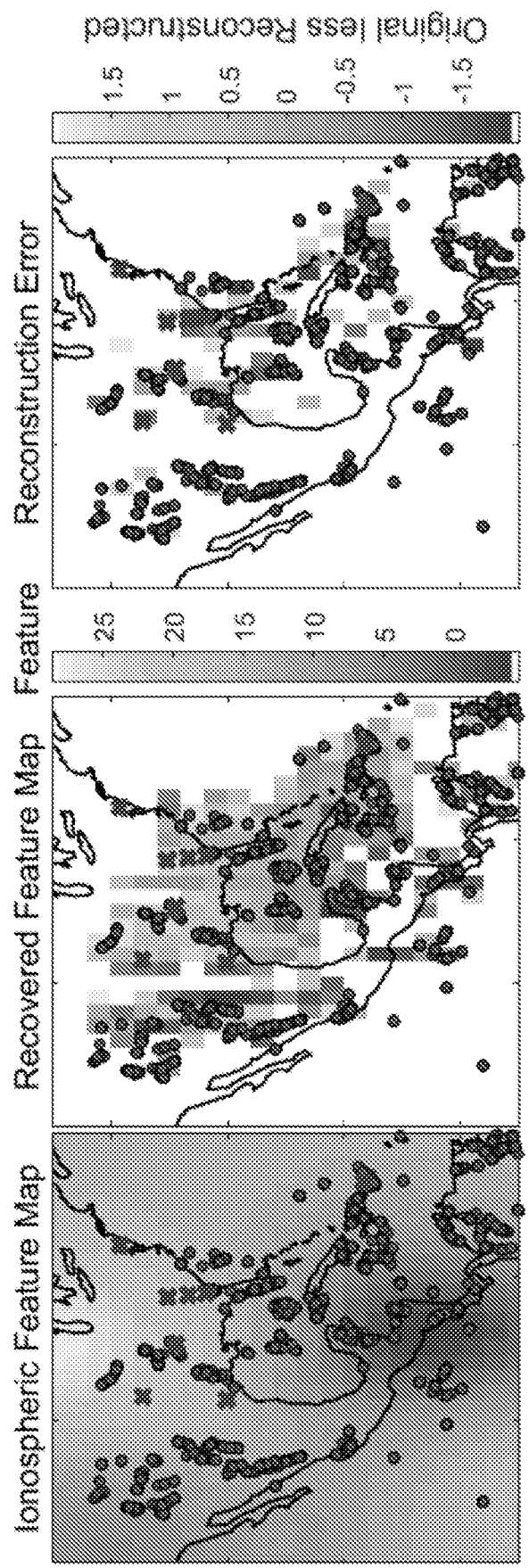
FIG. 11A-C illustrate the performance of the pixel basis D region tomography algorithm with moderately noisy inferences, in accordance with some embodiments of the present disclosure.

In the real world, we always need to have a procedure to deal with noisy measurements. We begin by considering the effect of moderate noise on the reconstruction in FIGS. 11A-C. The reconstruction performance is markedly worse in this case with only a small geographical location having reasonable error. In order to help condition the effect of error on the solution, we investigate the effect of Tikhonov regularization on reconstruction.

Figures 12A, 12B, 12C:
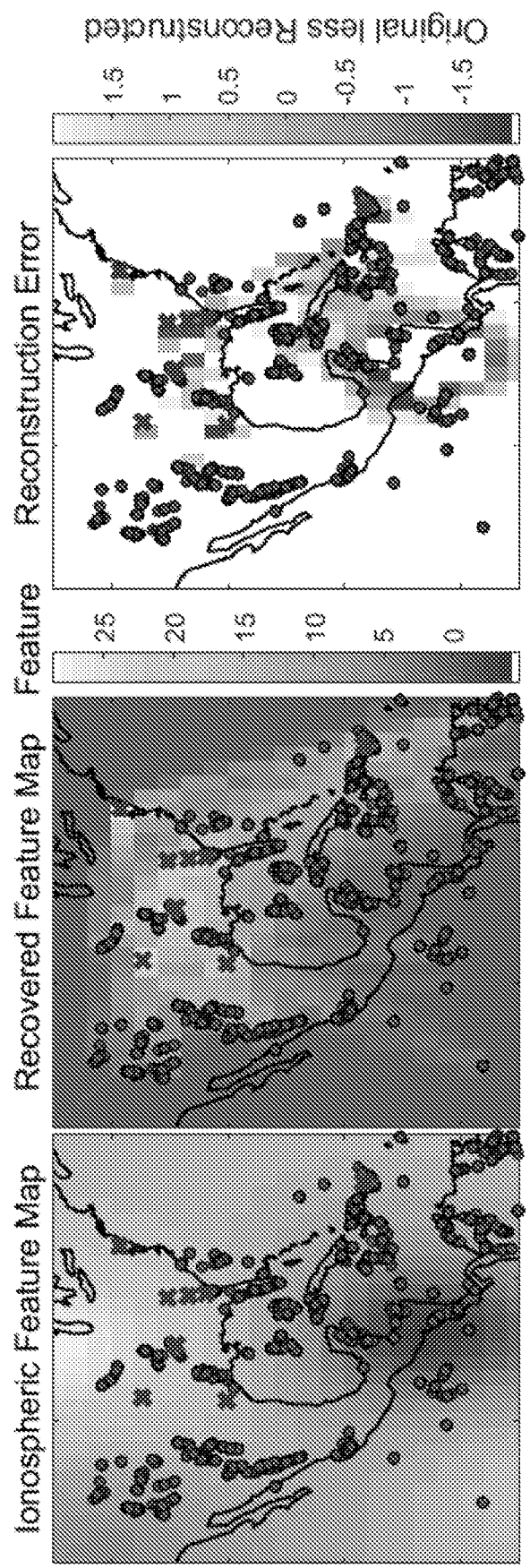
FIGS. 12A-C illustrate the performance of the pixel basis D region tomography algorithm with noiseless inferences and Tikhonov regularization, in accordance with some embodiments of the present disclosure.

First, we consider the effect of Tikhonov regularization in the absence of noise in FIGS. 12A-C. Adding Tikhonov regularization poses the minimization problem $$\min_B \|y - Ax\|_2^2 + \|\delta x\|_2^2$$

where $\delta$ is the regularization parameter which controls the tradeoff between the best least squares solution and lower solution energy. We show an example with a relatively large value for $\delta=3$. The solution is degraded over the noiseless case since the reconstruction downplays the contribution of small singular values. The image performance is still only reasonable inside of the measurement region. However, imaging performance is only acceptable in a smaller region which is covered by more transmitter-to-receiver paths. For the measurement geometries in this work, Tikhonov regularization tends to downplay the effect of more sparsely measured pixels.

Figures 13A, 13B, 13C:
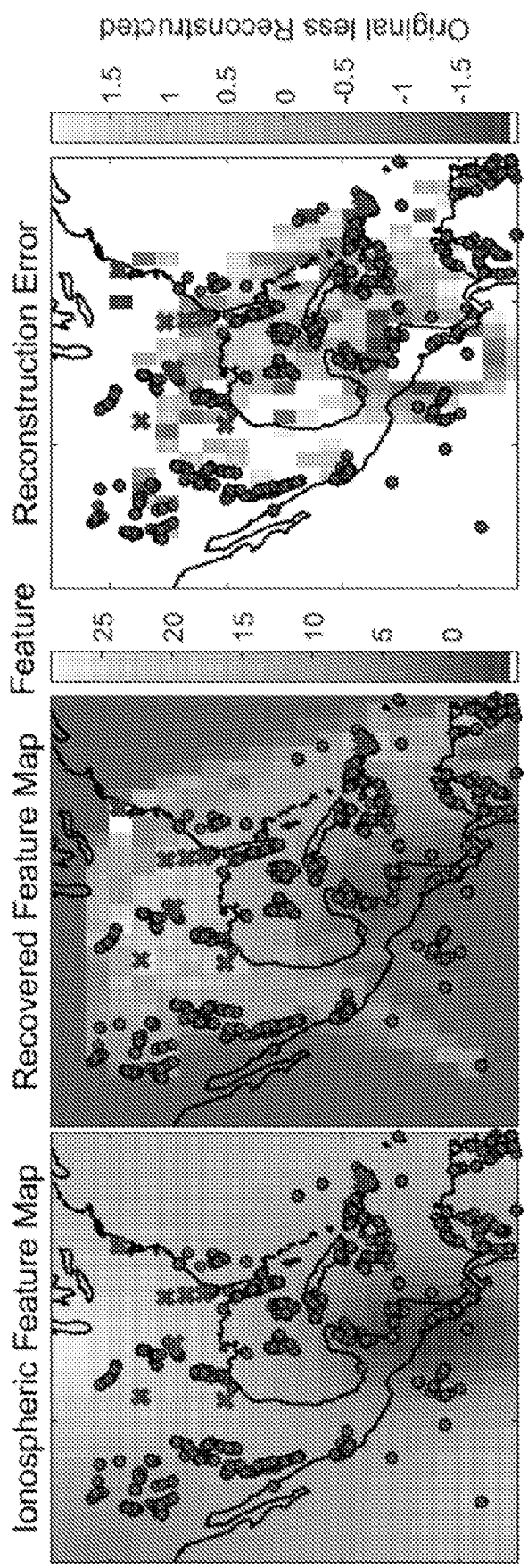
FIGS. 13A-C illustrate the performance of the pixel basis D region tomography algorithm with moderately noisy inferences and Tikhonov regularization, in accordance with some embodiments of the present disclosure.

Finally, we consider the moderate error case with Tikhonov regularization and $\delta=0.3$ in FIGS. 13A-C. The regularized solution tends to lower the value of reconstructed pixels towards the outer bounds of the measured region. Since the notion of "energy" in the context of Tikhonov regularization has to do with the $l_2$ norm, it tends to force lesser measured pixels to low values and clip pixels outside of the measured region to zero. Therefore, in terms of measured ionospheric features, the tradeoff of Tikhonov regularization is between a noisy inferred image and a smaller imaged region that we can rely on.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:
   receiving electromagnetic signals at receivers, the electromagnetic signals having propagated along a distinct propagation path through a portion of a D-region of an ionosphere corresponding to one or more grid pixels corresponding to at least a portion of the D-region of the ionosphere;
   clustering at least a portion of the electromagnetic signals based on similarities in a point-of-origin of the electromagnetic signals, the clustered signals representative of a clustered path from a point of origin to one of the receivers through one or more of the grid pixels;
   determining a path-averaged electron density curve for at least a portion of the clustered signals;
   determining a basis representation of an electron density curve of the grid pixels, the basis representation consistent with the path-averaged electron density curves; and
   generating, based at least in part on the determined basis representation, an electron density map for the at least a portion of the D-region of the ionosphere.

2. The method of claim 1 further comprising defining the grid pixels that correspond to the at least a portion of the D-region of the ionosphere;
   wherein each of the grid pixels have a substantially equal size in longitude and latitude;
   wherein determining the basis representation of the electron density curve of the grid pixels comprises applying a discrete cosine transform to the path-averaged electron density curves to obtain a discrete cosine transform coefficient for the grid pixels; and
   wherein generating the electron density map is based, at least in part on the discrete cosine transform coefficients.

3. The method of claim 2, wherein the discrete cosine transform is a two-dimensional discrete cosine transform.

4. The method of claim 1 further comprising defining the grid pixels that correspond to the at least a portion of the D-region of the ionosphere;
   wherein each of the grid pixels have a substantially equal size in longitude and latitude;
   wherein determining the path-averaged electron density curve for the clustered signals comprises selecting a best-fitting electron density curve from pre-determined electron density curves.

5. The method of claim 1, wherein the electromagnetic signals are selected from the group consisting of electromagnetic signals generated by lightning strikes, electromagnetic signals generated by very low frequency ("VLF") transmitters, and a combination thereof.

6. The method of claim 1, wherein the electron-density map is selected from the group consisting of a three-dimensional map having longitude, latitude, and altitude dimensions, and a four-dimensional map having longitude, latitude, altitude, and time dimensions.

7. The method of claim 1, wherein the similarities in a point-of-origin of the electromagnetic signals include similarities in one or more of the latitude, longitude, and altitude of the point-of-origin of the electromagnetic signals.

8. The method of claim 1, wherein the clustering is further based on similarities in time of origination of the electromagnetic signals.

9. The method of claim 1 further comprising:
defining the grid pixels that correspond to the at least a portion of the D-region of the ionosphere, wherein each of the grid pixels have a substantially equal size in longitude and latitude;
using the electron-density map to determine an effect of the D-region of the ionosphere on an electromagnetic signal to be transmitted from a first transmitter to a first receiver;
altering, based on the determined effect, a characteristic of the electromagnetic signal to be transmitted from the first transmitter to the first receiver; and
transmitting the electromagnetic signal with the altered characteristic from the first transmitter to the first receiver.

10. The method of claim 1, wherein receiving the electromagnetic signals comprises measuring a magnetic field of the electromagnetic signals at the receivers.

11. The method of claim 1, wherein one or both:
at least a portion of the electromagnetic signals include part of a frequency of 0.5-500 kHz; and
the D-region of the ionosphere has an altitude of 40-100 km.

12. A system for generating an electron density map of an ionosphere, the ionosphere comprising a D-region, the system comprising:
a processor; and
a memory, the memory comprising instructions that, when executed by the processor, cause the system to:
define a plurality of grid pixels corresponding to at least a portion of the D-region of the ionosphere, each of the grid pixels having a substantially equal size in longitude and latitude;
receive data indicative of a plurality of electromagnetic signals at a plurality of receivers, each of the plurality of electromagnetic signals having propagated along a distinct propagation path through a portion of the D-region of the ionosphere corresponding to one or more of the plurality of grid pixels;
cluster the plurality of electromagnetic signals based on similarities in a point-of-origin of the plurality of electromagnetic signals to generate a plurality of clustered signals, each of the plurality of clustered signals representative of a clustered path from a point of origin to one of the plurality of receivers through one or more of the plurality of grid pixels;
determine a path-averaged electron density curve for each of the plurality of clustered signals;
determine a basis representation of an electron density curve of the plurality of grid pixels, the basis representation consistent with the plurality of path-averaged electron density curves; and
generate, based at least in part on the basis representation, an electron density map for the at least a portion of the D-region of the ionosphere.

13. The system of claim 12, wherein the instructions, when executed by the processor, cause the system further to determine the basis representation of the electron density curve, at least in part, by applying a discrete cosine transform to the plurality of path-averaged electron density curves to obtain a discrete cosine transform coefficient for each of the plurality of grid pixels, and wherein the electron density map is generated at least in part based on the discrete cosine transform coefficients.

14. The system of claim 13, wherein the discrete cosine transform is a two-dimensional discrete cosine transform.

15. The system of claim 12, wherein the instructions, when executed by the processor, cause the system further to determine the path-averaged electron density curve for each of the plurality of clustered signals, at least in part, by selecting a best-fitting electron density curve from a plurality of pre-determined electron density curves.

16. The system of claim 12, wherein the plurality of electromagnetic signals are selected from the group consisting of electromagnetic signals generated by lightning strikes, electromagnetic signals generated by very low frequency ("VLF") transmitters, and a combination thereof.

17. The system of claim 12, wherein the electron-density map is selected from the group consisting of a three-dimensional map having longitude, latitude, and altitude dimensions, and a four-dimensional map having longitude, latitude, altitude, and time dimensions.

18. The system of claim 12, wherein the similarities in a point-of-origin of the plurality of electromagnetic signals include similarities in the latitude and longitude of the point-of-origin of the plurality of electromagnetic signals.

19. The system of claim 12, wherein the similarities in the point-of-origin of the plurality of electromagnetic signals include similarities in the latitude, longitude, and altitude of the point-of-origin of the plurality of electromagnetic signals.

20. The system of claim 19, wherein the instructions, when executed by the processor, cause the system further to cluster the plurality of electromagnetic signals further based on similarities in time of origination of the plurality of electromagnetic signals.

21. The system of claim 12, wherein the instructions, when executed by the processor, cause the system further to use the electron-density map to determine an effect of the D-region of the ionosphere on an electromagnetic signal to be transmitted from a first transmitter to a first receiver.

22. The system of claim 21, wherein the instructions, when executed by the processor, cause the system further to alter, based on the determined effect, a characteristic of the electromagnetic signal to be transmitted from the first transmitter to the first receiver.

23. The system of claim 22, wherein the instructions, when executed by the processor, cause the system further to transmit the electromagnetic signal with the altered characteristic from the first transmitter to the first receiver.

24. The system of claim 12, wherein the instructions, when executed by the processor, cause the system further to measure a magnetic field of each of the electromagnetic signals received at the plurality of receivers.

25. The system of claim 12, wherein each of the plurality of electromagnetic signals include part of a frequency of 0.5-500 kHz.

26. The system of claim 12, wherein the D-region of the ionosphere has an altitude of 40-100 km.

* * * * *